April 11, 1944.　　B. F. SCRIBNER ET AL　　2,346,512
ELECTRODE HOLDER FOR SPECTROGRAPHIC ANALYSIS
Filed April 21, 1943　　4 Sheets-Sheet 3

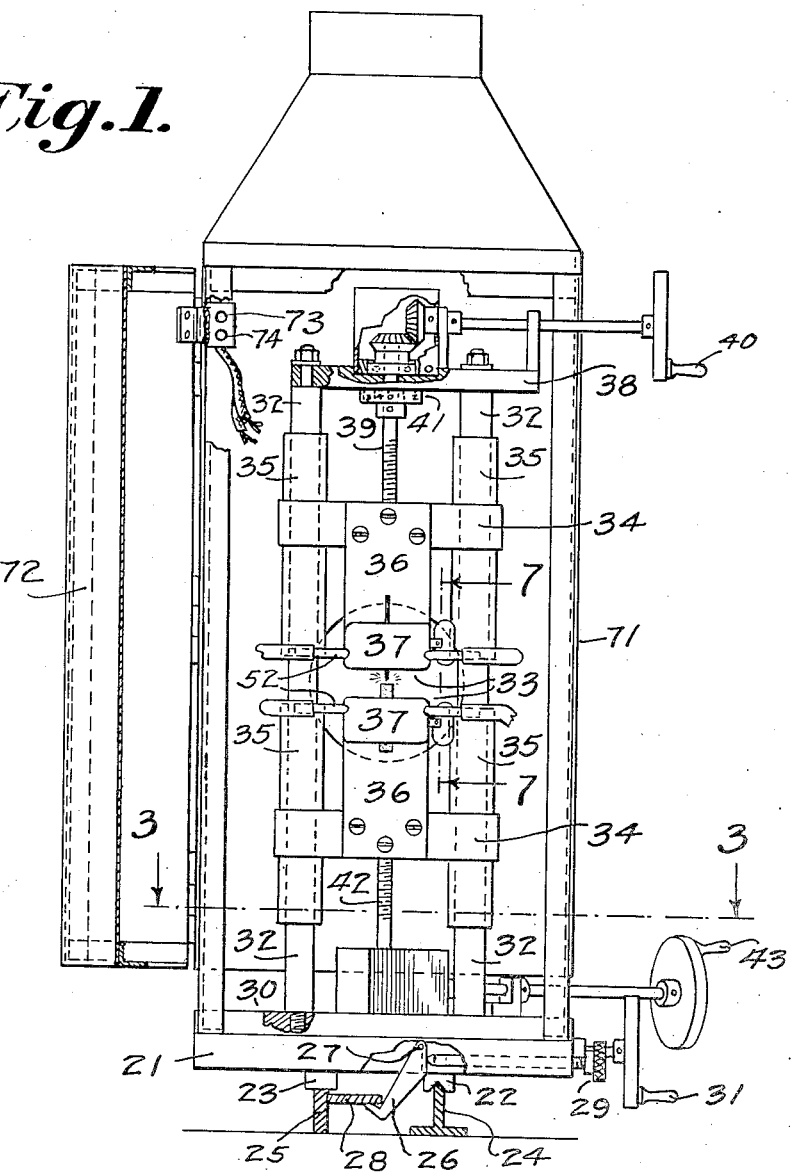

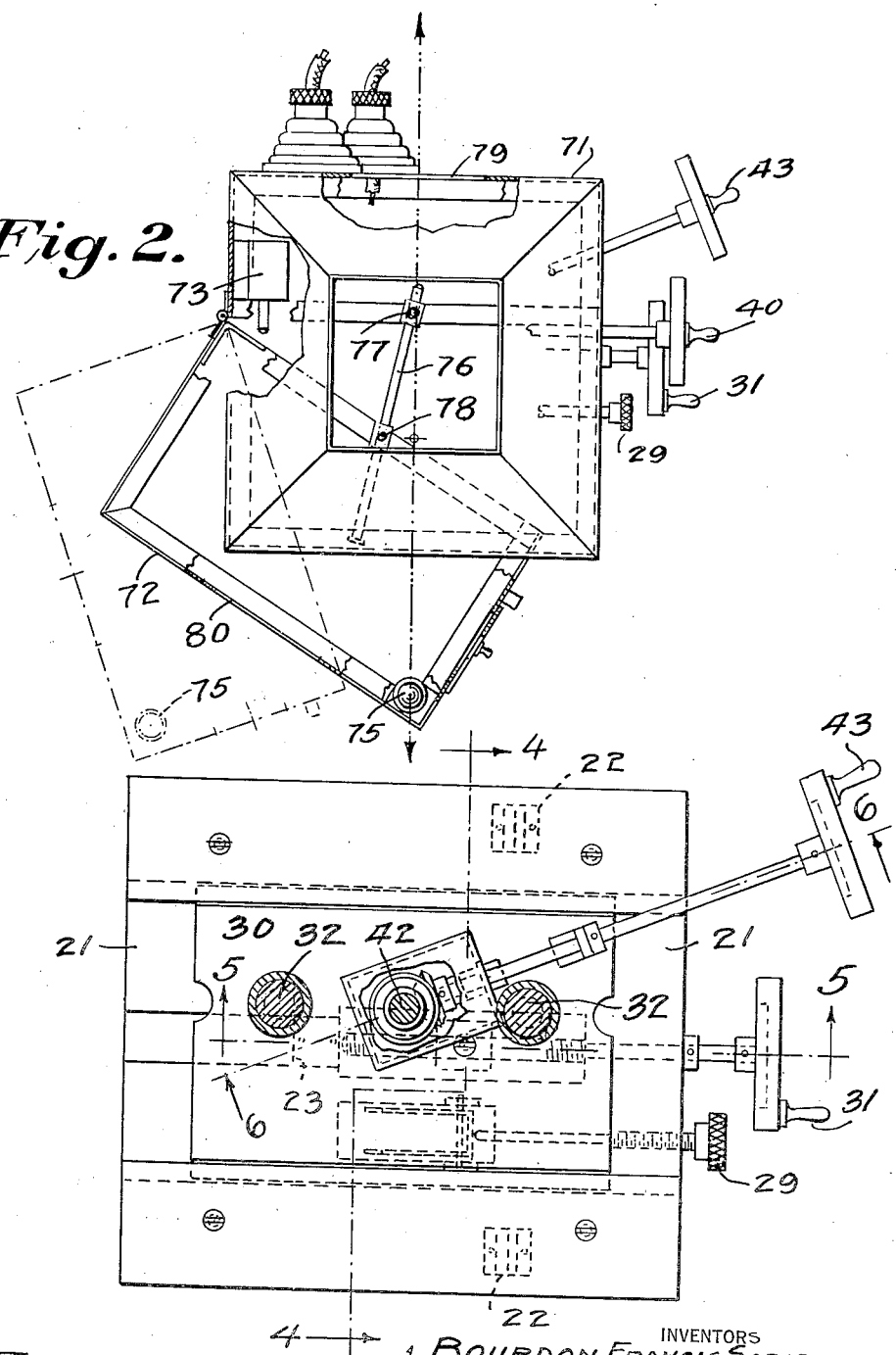

INVENTORS
BOURDON FRANCIS SCRIBNER
AND CHARLES HOWARD CORLISS
BY J. T. Motherhead
ATTORNEY April 11, 1944.   B. F. SCRIBNER ET AL   2,346,512
ELECTRODE HOLDER FOR SPECTROGRAPHIC ANALYSIS
Filed April 21, 1943   4 Sheets-Sheet 4

INVENTORS
BOURDON FRANCIS SCRIBNER
AND CHARLES HOWARD CORLISS
By J. T. Motherhead ATTORNEY Patented Apr. 11, 1944

2,346,512

UNITED STATES PATENT OFFICE 2,346,512

ELECTRODE HOLDER FOR SPECTROGRAPHIC ANALYSIS

Bourdon Francis Scribner, Washington, D. C., and Charles Howard Corliss, Medford, Mass., assignors to the Government of the United States, as represented by the Secretary of the Department of Commerce Application April 21, 1943, Serial No. 483,974

9 Claims. (Cl. 240—11.2)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

Our invention relates to an improved electrode holder for spectrographic analysis having means for accurately spacing and accurately aligning electrodes.

Our invention includes a protecting shield for safeguarding operators from injury from high voltage shocks and from injurious rays, particularly ultra violet, which may cause cumulative injury, as to the eyes.

Our invention further provides means for clamping electrodes of assorted sizes as well as thin sheet metal and rigid bars, including means for quickly renewing or interchanging electrodes.

This invention has been described in the illustrated Research Paper R. P. 1515, National Bureau of Standards, U. S. Department of Commerce.

In the accompanying drawings:

Figure 1 is an elevation of our device, the door being open to the full line position shown in Figure 2, partly in section.

Figure 2 is a plan view of the housing showing two open positions of the door, partly in section.

Figure 3 is a section on the line 3—3, Figure 1.

Figure 4:
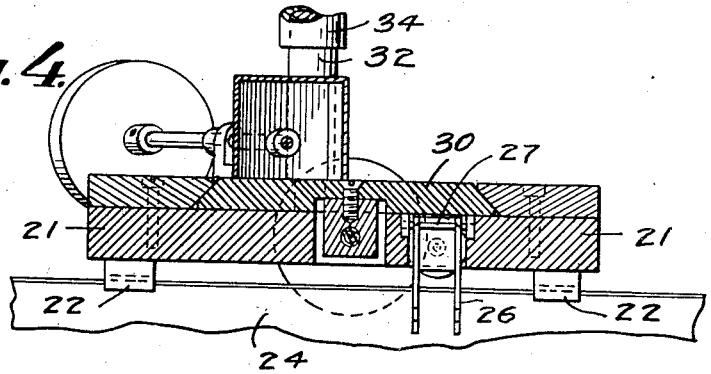
Figure 4 is a detail section on the line 4—4, Figure 3.

In these drawings, 21 represents a base, preferably made of steel, supported by a pair of grooved bearing blocks 22 and a flat bearing block 23 on rails 24 and 25 of an optical bench. The base is provided with adjustable locking means comprising claw-like members 26 pivoted to the base at 27 and clamped against a bar 28 of the optical bench by a threaded bolt having a knurled head 29.

Figure 5:
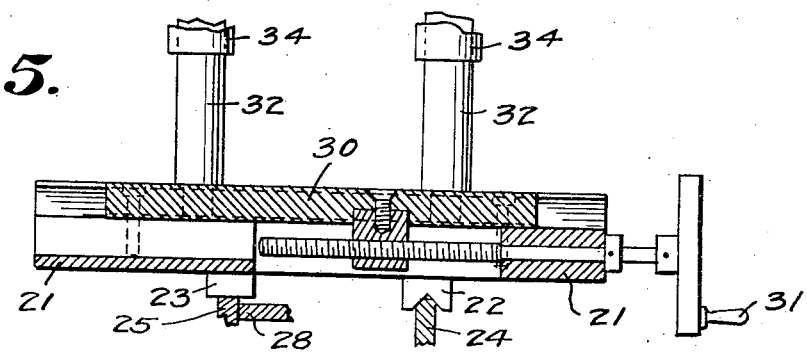
Figure 5 is a detail section on the line 5—5, Figure 3.
Figure 6:
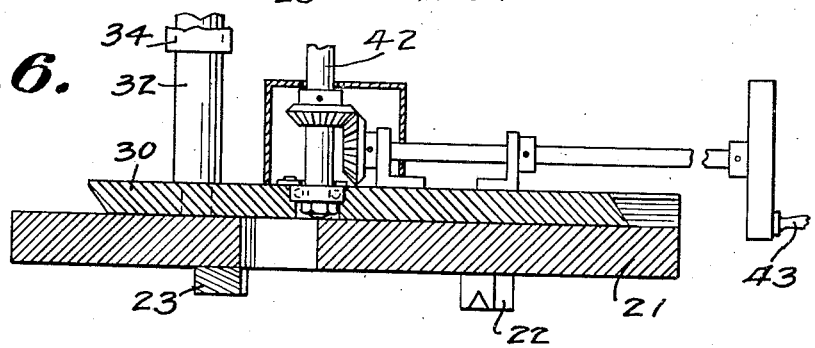
Figure 6 is a detail section on the line 6—6, Figure 3.
Figure 11:
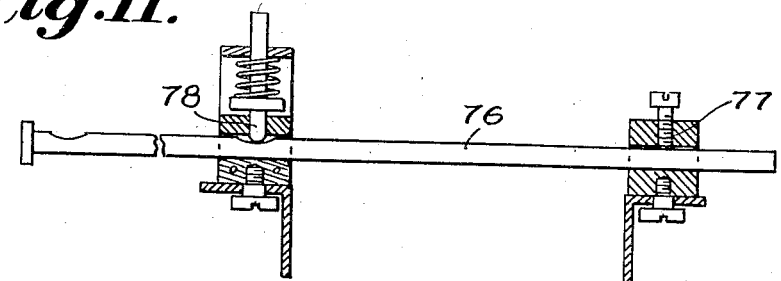
Figure 11 is detail of a yielding door stop.

On the base 21 is mounted a slide 30 which is dove-tailed thereto, see Figs. 3 and 4. This slide 30 is moved laterally by a nut and screw, the latter having an operating handle 31, see Figure 5. The slide carries two rigidly attached rods 32, which guide a pair of electrode supports 33. Each support is H-shaped with a rigid bar 34 joining two relatively long sleeves 35 which slide on the rods 32. To each bar 34 is bolted an insulating Bakelite plate 36 which rigidly supports an electrode clamp 37. The rods 32 are braced at their upper ends by a plate 38 which also provides a bearing for a screw 39 threaded into the bar 34. For convenience, the screw 39 is manually operated by a handle 40 through mitre gears and a laterally extending shaft. To the screw 39 there is rigidly connected a graduated drum 41 under the plate 38. The companion electrode support is vertically adjusted by a screw 42 and operating handle 43 which correspond to the upper control assembly, except that the graduated drum is omitted.

Figure 7:
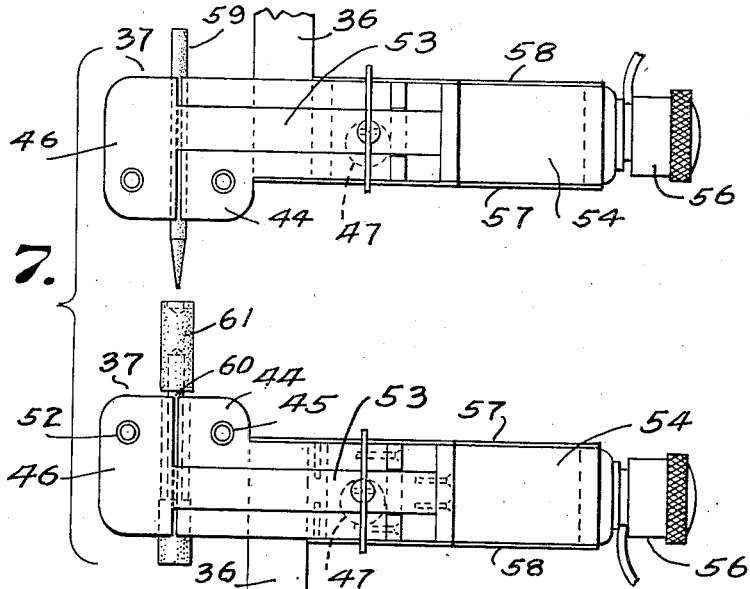
Figure 7 is a detail side elevation of our electrode clamps, enlarged, looking in the direction of the line 7—7, of Figure 1.
Figure 8:
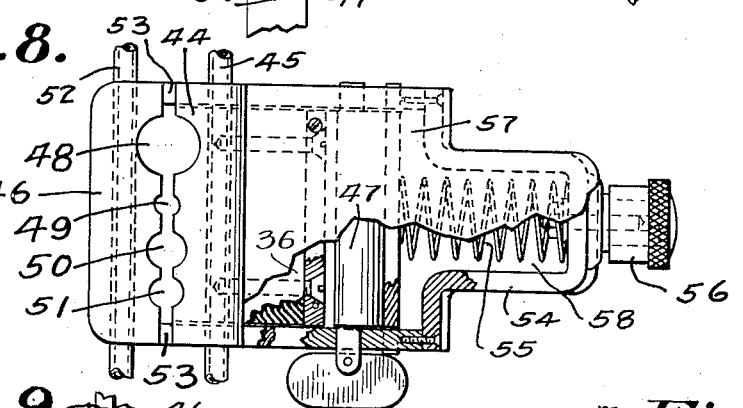
Figure 8 is a detail plan view of one of our electrode clamps, partly in section.

The electrode clamps are shown in detail in Figures 7 and 8, in which a fixed jaw 44 is bolted to the Bakelite plate 36. The jaw 44 is provided with a tube 45 for the passage of cooling liquid, a pair of lateral guide grooves for a companion jaw 46 and a transverse passage for an eccentric 47 mounted in the jaw 46 and a plurality of vertical, semi-circular grooves 48; 49; 50 and 51 of different radii which are aligned with corresponding grooves in the movable jaw and may also vary in size between the bottom and the top to allow for fitting commercial electrodes and for avoiding strains in electrodes which are not absolutely straight.

The movable jaw 46 is provided with a tube 52 for the passage of cooling liquid, a series of vertical, semi-circular grooves corresponding to those in the fixed jaw 44 and two rigidly attached bars 53 which slide in the lateral grooves of the fixed jaw. The bars 53 also provide bearings for the eccentric 47 and are joined by a somewhat U-shaped member 54 which serves as a housing for a compression spring 55, which pulls the jaw 46 against the fixed jaw 44. These clamps are provided with binding posts 56 for connection with a source of electric power, an inner cover plate 57, see Figures 7 and 8, and an outer cover plate 58, each of which is bolted to the fixed jaw and serve to complete a housing for the eccentric 47 and the spring 55.

Figure 7 is an enlarged side elevation showing our companion clamp holding an upper pointed carbon electrode 59 and a lower two-part electrode 60 having a replaceable cup-like terminal 61 provided with a recess for holding a specimen to be tested. This two-part form of electrode makes possible a saving in cost because the terminal portion is usually made of relatively expensive carbon.

Figure 9:
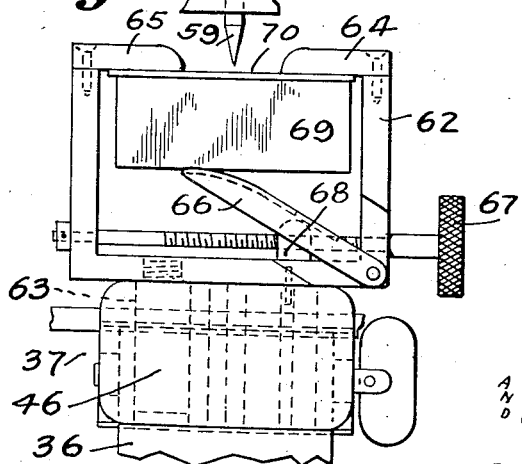
Figure 9 is a detail enlarged elevation of an accessory clamp for holding sheet samples, mounted in our main lever clamp.
Figure 10:
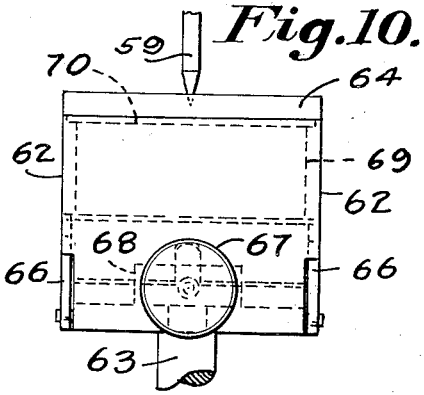
Figure 10 is a side elevation of our accessory clamp shown in Figure 9.

For using samples in sheet or bar form we provide an accessory clamp 62, see Figures 9, 10, with attaching studs, such as indicated by 63, which fit in corresponding holes in one of our clamping jaws. This clamp has two inwardly extending flanges 64 and 65 and a hinged jaw 66 manually adjusted by means of a screw having a knurled head 67 working in a pressure transmitting nut 68. This clamp will accommodate both relatively thick samples or thin sheet samples, in the latter case a rigid backing block 69 of copper or the like transmits clamping pressure to the margins of the sheet such as 70.

To accommodate electrodes or cylindrical specimens which do not fit in any of the holes of our electrode clamps we use split copper bushings, not shown, externally machined to fit holes in our clamps.

A housing 71 for our holder is built on a frame of angle iron, covered with sheet metal. The door 72 of the housing is the forward half of the housing and serves to operate a safety circuit breaker 73 in the high voltage power circuit and also closes a second switch 74 to a lamp 75 in a corner of the door. This door may be opened for renewing electrodes or samples to the dot and dash position indicated in Figure 2, in which position the lamp illuminates the clamps and other parts, though shielded from the eyes of the operator. There is also a bar 76 pivoted at 77 to a cross-frame located in the housing and a spring controlled plunger 78 which engages a notch in the bar 76 which serves as a stop to position the lamp and electrodes in alignment with an opening 79 in the rear of the casing for projecting an image of the electrodes on a screen, not shown, on the optical path to facilitate the adjustment of the electrode positions. There is also an opening 80 in the face of the door through which, when the door is closed, passes the optical path to a spectrograph, not shown. Our housing serves to safeguard the operator by protecting his eyes from ultra-violet rays because the circuit to the electrode is opened whenever the door is even partly open; secondly, from accidental electric shock because no voltage is supplied to the electrode clamps while the door is open; and, thirdly, by carrying off through the hood any noxious gases formed in the arc.

The operation of our device is as follows: With the door opened to the dot and dash position, Figure 2, our electrode clamps are illuminated from the electric light 75 in the door, the lower one of our electrode clamps is opened by turning the handle of the eccentric 47, an electrode containing a specimen to be analyzed is inserted in one of the holes of the clamp and the eccentric is again turned ninety degrees (90°) to release the jaws to clamp the electrode. The same procedure may be followed for lowering an electrode through the upper clamp. The door is then closed to the intermediate stop and with the aid of a lens and a screen, not shown, an image of the electrodes is projected on the screen and by turning the handle 31 the image is centered between the vertical edges of the screen. The image is then centered vertically by turning the cranks 40 and 43. The electrodes are then separated by a pre-determined distance by turning the crank 40 and counting the revolutions and fractions of a revolution of the attached drum 41. The entire structure may be adjusted along the rails 24 and 25 by releasing the claw-like members 26 by means of the knurled head 29, or if desired, this member 26 may be further released and the whole device may be removed from the optical bench.

The door is then closed, which automatically turns off the current to the lamp 75 and closes the safety circuit permitting completion of the high voltage circuit through the electrode, producing light which passes through the hole in the door to a slit in the spectrograph assembly, not illustrated.

The foregoing description of our preferred form of our invention is not intended to restrict our claims to that form, but we claim the inventions herein disclosed without any limitations other than those of the claims which may be allowed.

What we claim is:

1. An electrode clamp comprising a movable jaw provided with two rigidly attached bars and a passage for cooling fluid, a fixed jaw provided with a groove for each of said bars and also provided with a passage for cooling fluid, resilient means for closing said jaws, and manually operated means for opening said jaws in opposition to said resilient closing means.

2. In a precision-acting electrode holder for rapid spectrographic analysis, an electrode clamp comprising two water-cooled jaws having a plurality of electrode-engaging openings to fit closely electrodes of several standard sizes and provided with manually operated resilient means for quickly clamping and releasing an electrode.

3. In a precision-acting electrode holder for rapid spectrographic analysis, an electrode clamp of high heat conductivity, comprising a water-cooled fixed jaw mounted on an insulating support and having a plurality of electrode-engaging grooves of varying sizes, a water-cooled movable jaw provided with two rigidly attached guiding and supporting bars and also provided with corresponding electro-engaging grooves, a yoke joining the outer ends of said bars, a compression spring within said yoke, a guiding and supporting channel for each bar of said movable jaw and a manually operated cam revolubly mounted in bearings in said bars for opening said jaws in opposition to said spring.

4. The combination with an electrode holder for spectrographic analysis, of a two-part protecting housing opaque to rays injurious to eyes, comprising a relatively fixed portion and a closure portion hinged to said first portion, an electric lamp mounted within the closure portion and supplied by a lighting circuit, a circuit closer for said circuit for completing said circuit when the housing is opened, a bar pivoted to one part of said housing and slidably connected with the companion housing portion, and a stop limiting the movement of said bar and housing to set said lamp in a predetermined optical path, whereby light may be directed at the electrodes and through an opening in the rear of the housing to permit forming an image of the electrodes on a screen and thus facilitate the adjustment of the electrode positions.

5. A sample holding accessory clamp for spectrographic analysis comprising an electrically conductive frame acting as a fixed supporting jaw for samples, a clamping jaw hinged to said frame, screw-operated means for transmitting force to said clamping jaw and an electrically conductive attaching stud secured to said frame and adapted to be detachably engaged in a permanent electrode clamp.

6. An accessory clamp for rigidly and accurately holding samples that cannot be accommodated in the usual electrode clamp for spectrographic analysis, comprising an electrically conductive U-shaped frame having facing inwardly-extending flanges forming a fixed two-part jaw against which the sample is clamped, a movable jaw hinged to said frame, screw-operated means for transmitting force to said movable jaw, and electrically conductive studs extending from the bottom of said frame adapted to detachably engage in a permanent electrode clamp.

7. An accessory clamp of high heat conductivity for holding samples that cannot be accommodated in the usual electrode clamp for spectrographic analysis, comprising an electrically conductive U-shaped frame terminating in inwardly-extending flanges against which the sample is clamped, a clamping block of high heat conductivity, a movable jaw hinged to said frame, screw-operated means for transmitting force through said movable jaw to said block, and electrically conductive attaching studs extending from the bottom of said frame adapted to detachably engage the frame in a permanent electrode clamp, said frame being rigidly and accurately held therein in the proper alignment for use.

8. An electrode for use in spectrographic analysis comprising a relatively permanent portion and a replaceable terminal portion provided with an axial recess for detachably mounting it upon said permanent portion, said terminal portion being provided with a specimen holding recess.

9. An electrode for use in spectrographic analysis comprising the combination of a supporting portion and a small replaceable terminal of carbon mounted upon said supporting portion, the mounting consisting of an aligning plug and socket arrangement formed in the respective pieces.

BOURDON FRANCIS SCRIBNER.
CHARLES HOWARD CORLISS.